April 30, 1963 R. W. PFEIFFER ETAL 3,087,898
METHOD FOR SUPPLYING GASEOUS MATERIALS
Filed Oct. 22, 1957
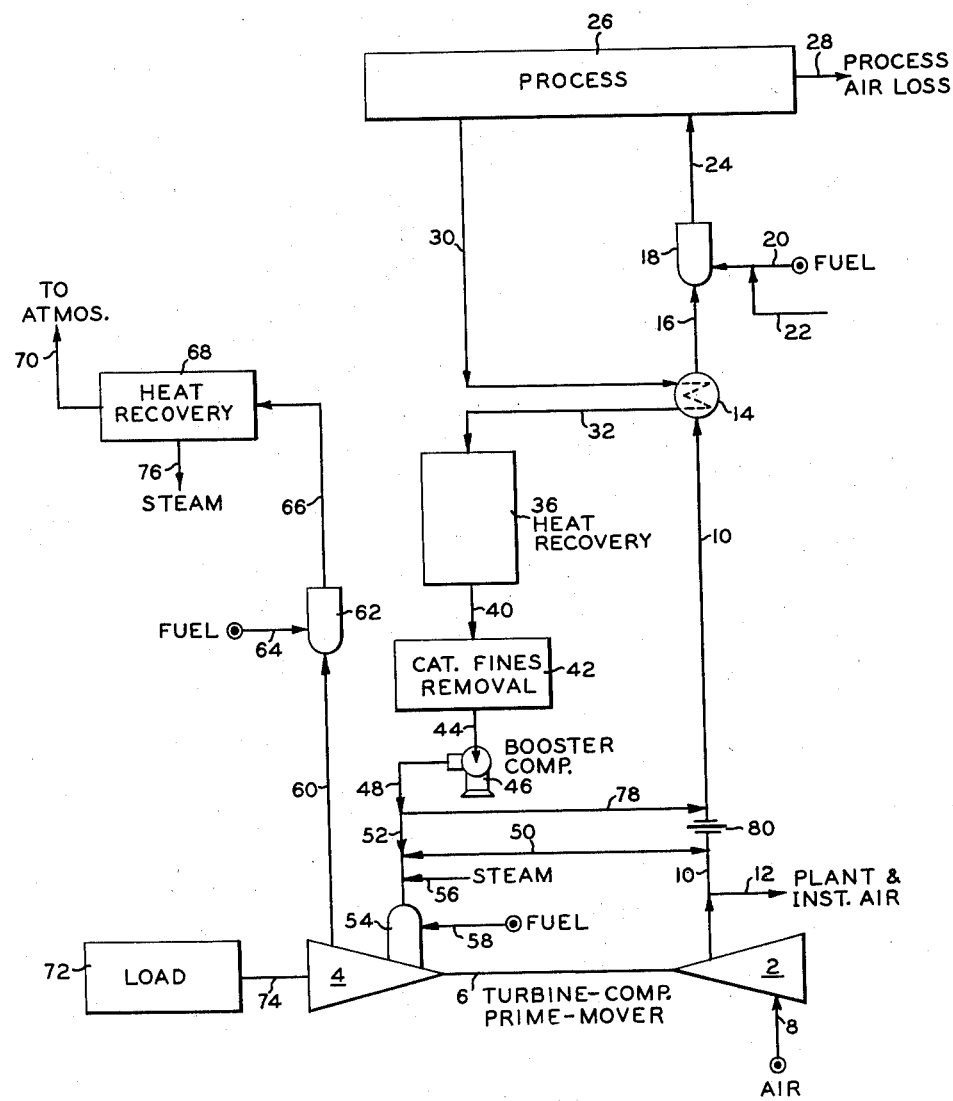
INVENTORS
ROBERT W. PFEIFFER
ARTHUR W. KELLY, JR.
BY
AGENT
ATTORNEY United States Patent Office 3,087,898
Patented Apr. 30, 1963

3,087,898
METHOD FOR SUPPLYING GASEOUS MATERIALS
Robert W. Pfeiffer, Bronxville, and Arthur W. Kelly, Jr., Riverdale, N.Y., assignors to The M. W. Kellogg Company, Jersey City, N.J., a corporation of Delaware
Filed Oct. 22, 1957, Ser. No. 691,655
13 Claims. (Cl. 252—416)

This invention relates to an improved method for supplying large volumes of air or gaseous material to various catalytic, chemical, metallurgical and thermal processes. In one aspect it relates to a process wherein a gas turbine- compressor is integrated in a process employing large volumes of a gaseous material.

This application is a continuation-in-part of application 665,823, filed June 14, 1957, now U.S. Patent No. 3,012,082.

In recent years conversion processes have gained prominence, particularly in the conversion of hydrocarbons. In such processes, whether in a fixed bed, moving bed or a dense fluidized bed, the reactants are contacted with a suitable catalyst or inert contact material at elevated temperature and pressure conditions such that the reactants are converted to yield more valuable products. During some of these processes the catalyst or solid contact material gradually becomes contaminated by carbonaceous deposits which reduce, in many instances, the effect of the catalyst or contact material. As a result, after a period of use, the catalyst or contact material must be regenerated by combustion of the carbonaceous deposits. The cost of the required apparatus necessary to provide the regeneration air in sufficient quantities constitutes one of the large cost items in the operation of such conversion processes. Consequently, the regeneration stage often limits the overall conversion capacity of a given commercial unit.

Another large cost item of the prior art processes is the large process gas compression plant which is needed to deliver the products of reaction from a relatively low pressure zone to a product recovery system operated at an elevated pressure. If condensing steam turbine prime movers are used to supply the power requirements for the regeneration air compressor and the process gas compressor, then the overall thermal efficiency of the steam cycle might be about 18 percent when referred back to the fuel fired in furnaces to generate the motive steam, resulting in high operating costs.

Accordingly, it is an object of this invention to provide an improved system for economically and efficiently supplying large volumes of air or gaseous material at an elevated temperature and pressure.

It is another object of this invention to provide an improved method of regeneration for a catalytic conversion process.

It is still another object of this invention to provide a process of improved thermodynamic efficiency for supplying gaseous materials.

It is still a further object of this invention to improve the method of supplying the endothermic heat requirements for a catalytic dehydrogenation process.

Other objects and advantages of the present invention will become apparent to those skilled in the art from the following description.

In one aspect this invention is directed to an improved method for supplying large volumes of gaseous material to various processes, such as, catalytic, chemical, metallurgical and thermal processes. This new and improved method utilizes a gas turbine-compressor prime mover to supply large quantities of gaseous material to the process. In another aspect this invention is directed to providing prime mover power output which may be equal essentially to the horsepower rating of the gas turbine-compressor prime mover and which may be used, in a more efficient and economical manner, for purposes other than supplying air. In addition to the above, the power requirements of an external load can be obtained at a high thermal efficiency by passing the exhaust air separated from the turbine through suitable waste heat recovery equipment.

The present invention is directed in another embodiment to an improved method of employing a gas turbine-compressor prime mover and a booster compressor in a regeneration system for regenerating a bed of catalyst employed in the conversion of hydrocarbons wherein carbonaceous material is deposited on the catalyst, which is periodically removed by the process involving; compressing regeneration gases to an elevated pressure by the compressor stage of the fired turbine-compressor prime mover, passing the compressed gases such as air at an elevated temperature to a preheat stage wherein the gases are preheated by indirect heat exchange to an elevated temperature of about 525° F. to about 825° F., further heating the preheated compressed gaseous material to an elevated temperature of about 525° F. to about 1250° F. by direct combustion of a combustible material therewith and then passing the thus heated gaseous material to a bed of catalyst to remove carbonaceous material therefrom by burning, recovering effluent regeneration gases from the catalyst bed at an elevated temperature and pressure and passing the same to the indirect heat exchange step at a temperature in the range of from about 525° F. to about 1250° F. to impart heat to the regeneration gases in the indirect heat exchange step, recovering effluent gases from the indirect heat exchange step at an elevated temperature within the range of from about 525° F. to 1250° F. and passing the same through suitable heat recovery equipment to lower the temperature of the regeneration effluent gases to a range of from about 300° F. to about 730° F. prior to their passage to a catalyst fines removal zone, separating fines from said effluent gases in said fines removal zone, passing regeneration effluent gases separated from the catalyst fines in said fines removal zone at a temperature in the range of from about 300° F. to about 730° F. to a booster compressor, raising the pressure of the effluent gases in said booster compressor to from about 65 to about 100 p.s.i.a., preferably substantially equal to the pressure of the gases discharged from the first compression zone, passing regeneration effluent gases to the fired turbine and expanding the same in said fired turbine, recovering expanded effluent gases from said fired turbine, heating said recovered expanded effluent gases by direct combustion with a combustible material and passing the expanded effluent gases at an elevated temperature to a heat recovery zone, generating steam in said heat recovery zone and employing said generated steam in said process.

In another aspect, the improved process of the present invention employing the booster compressor in the regeneration effluent stream, which may be referred to as a hot effluent booster, provides several operating advantages for the producer. In one respect a substantial reduction in the reactor operating pressure may be employed, for example, the pressure may be reduced from about 89 p.s.i.a., to about 72 p.s.i.a., which reduces both the average and the minimum instantaneous process air loss which occurs when a reactor is being repressured. An additional advantage resulting from this reduction in operating pressure resides in the variation of allowable water vapor content in the regeneration gases, generally not to exceed about 5 p.s.i.a. for a catalytic dehydrogenation process. In other words, control of the water vapor partial pressure imparted to the regeneration gases by the direct fired heating zone to obtain the necessary temperature increase to the regeneration gases over that obtained by the indirect heat exchange step becomes less critical and the producer can eliminate a water knock-out system including such additional equipment as a water knock-out supply drum, condensate cooling tower, and associated pumps. This eliminates additional operating and maintenance problems which would be particularly troublesome when operating in areas of low winter temperatures. In addition to the above, the design also reduces the required maximum quantity of steam injection to the inlet of the gas turbine to supplement the loss of gases from the process through depressuring, purging, etc. The smaller quantity of repressuring air flow also results in a smaller fluctuation in air flow to the waste heat boilers thereby reducing the net effect on steam production for example. Furthermore, the rate of depressuring the reactor may also be decreased directly, and this is desirable to reduce the chance of damaging the catalyst or the reactor lining through too rapid depressuring. In addition to these advantages there are also the following advantages. The inlet hot gas temperature to a deaerator feed water exchanger of the heat recovery section of the process remains substantially constant both winter and summer. This is in contrast to a process employing a water knock-out system where the inlet hot air temperature falls several degrees for every one degree in ambient temperature, thus requiring substantial over design of the waste heat boilers for winter operation. Furthermore, the catalyst fines removal system may be operated at a lower pressure, temperature and cubic feet per minute flow capacity thereby allowing for a substantial improvement or reduction in investment and operating expenses of the equipment. The hot booster compressor, while still a single wheel machine, has as a result of this method of operation an increased adiabatic head and a substantial increase in c.f.m. capacity. This will help in start-up operations by increasing the net amount of start-up steam that can be generated in the waste heat boilers. On the other hand, if the booster compressor is employed with atmospheric suction to heat or cool the reactor beds, the increased booster capacity substantially reduces the time required.

The catalyst employed in a conventional dehydrogenation process such as a chromia-alumina catalyst, is sensitive to certain impurities such as water, various metals and sulfur or sulfur compounds. Consequently there are limitations on the type of fuel, as well as the quantity which can be burned if a direct fired air heater (the cheapest method) is used to heat the air to a temperature suitable for regeneration of the catalyst in a range of from about 525° F. to about 1250° F. Since the catalyst is sensitive to the water vapor content of the regeneration gas at the inlet to the reactors it is essential to maintain, particularly in a dehydrogenation process, the water vapor content of the regeneration gas at a very low value. Accordingly, residual fuels and gas oils are less desirable for use in the direct fired air heater, because of their metals and sulfur content, while a fuel gas which has a high hydrogen content may limit the total pressure at which the regeneration can be carried out. Therefore, applicants' invention is in part directed to developing a regeneration system which not only provides greater flexibility in operation with a simultaneous reduction in investment and utility costs, but which also substantially reduces the limitations of water partial pressure and mol percent oxygen available for regeneration, thereby providing greater flexibility in the selection of regeneration pressure and allowing the use of a wider variety of combustible fuels in the direct fired heater.

Applicants' improved process and sequence of steps may be effectively employed in a variety of different processes, particularly those requiring large volumes of gaseous material, whether inert or active in the process, at elevated pressures with or without elevated temperatures. Furthermore, in processes employing air or oxygen containing gases, the flexibility of applicants' process enables varying the oxygen content of the regeneration gases within any desired range depending upon the demands of the process, from about 0 percent to about 100 percent by volume.

Some of the processes to which applicants' improved system may be applied are those involving hydrocarbon coinversion, thermal processes, chemical and metallurgical processes or any other process requiring large volumes of gaseous material at elevated pressure. The processes to which applicants' improvement is particularly applicable are those involving oxidation in either fluid bed, moving bed or fixed bed operation.

Other processes to which the present invention is applicable are those involving such processes as fluid hydroforming, low temperature carbonization, tonnage oxygen, ammonia synthesis, nitric acid and partial oxidation processes, such as ethylene oxide, propylene oxide, acrolein, phenol, acetone by cumene oxidation and acetic acid.

In accordance with one embodiment of applicants' invention, air for regeneration of the catalyst in a catalytic dehydrogenation reaction system is first compressed to within a range of from about 60 to about 100 p.s.i.a., preferably about 78 p.s.i.a. The compressed air is then preheated by indirect heat exchange with hot regeneration effluent gases to a temperature of from about 525° F. to about 825° F., preferably about 767° F. and the thus preheated regeneration air under pressure is further heated to a desired temperature of from about 525° F. to about 1250° F. in a direct fired burner before being passed to the reactor or reactors to be regenerated in a cyclic process. The amount of heat input to the regeneration air by either indirect heat exchange or direct firing fuel is determined by the process requirements for maintaining the water partial pressure of the regeneration gases below about 5 p.s.i.a.

An important feature of the process of the present invention resides in passing the effluent regeneration gases at a temperature in the range of from about 525° F. to about 1250° F., preferably about 1125° F., through suitable heat recovery equipment to reduce the temperature of the effluent gases to within a range of from about 300° F. to about 730° F., preferably about 390° F., prior to passing the effluent gases to a catalyst fines removal stage. Thereafter the effluent gases are passed to a booster compressor which raises the pressure of the effluent gases to from about 65 p.s.i.a., to about 100 p.s.i.a., preferably about 79 p.s.i.a., or equal to the outlet pressure of the regeneration gas from the compression stage of the fired turbine prime mover. The thus pressurized effluent gases are then either or both recycled in part through the process or passed to the fired turbine depending upon the demands of the process as hereinafter described.

Another important improvement of the present invention lies in the versatility of varying the oxygen content of the regeneration gases and the unrestricted flow of compressed air or oxygen containing gas to the turbine inlet from the compression stages to assure adequate supply of oxygen to the turbine to sustain combustion. Normally, however, a portion of the compressed regeneration effluent gases from the booster compressor are recycled for the oxygen content of the regeneration air. In this step depropanizer tail gas, for example, may be introduced to the burner 18 by conduit 20 or any other suitable fuel, such as methane fuel gas, may be introduced to fired heater 18 by conduits 20 and 22 to elevate the temperature of the regeneration air by combustion as previously stated. In the event that insufficient tail gas is available for use in burner 18, the remainder of the required heat may be provided by firing methane or another suitable fuel introduced by conduit 22 as previously stated. After the regeneration air has been heated to regeneration temperatures of about 1175° F., the hot pressurized regeneration air is passed at a rate of about 714,500 pounds per hour through conduit 24 to the reactor or reactors requiring regeneration which are represented by box 26. The reactor containing the dehydrogenation catalyst to be regenerated is contacted with the preheated regeneration air to burn out the coke and sufficient hot regeneration air is provided in excess to even out the temperature profile of the catalyst bed. The cyclic method for operating a plurality of reactors wherein a reactor consecutively passes through reaction, purge, regeneration, purge and reaction is a part of this invention only to the extent that the regeneration gases are passed to the proper reactor at the proper time in order to accomplish the above sequence of steps, remove the carbonaceous deposits from the catalyst and supply the necessary endothermic heat to the catalyst bed for the dehydrogenation reaction. This invention is particularly applicable in a multiple reactor system in which at least one reactor is normally on regeneration at any one time. During this time, which may be equal to approximately ½ of the reaction time, the same total air flow passes through the reactor as would be passed through a reactor system which employs another reactor in parallel for a regeneration time equal to the full reaction period. That is, the air flow rate is doubled and the time cut in half, thus maintaining the same "air blow" in both cases. In this embodiment, the efficiency of regeneration of the one reactor is equivalent to the regeneration that would be obtained at low pressures with two reactors in parallel. The catalyst bed pressure drop is approximately the same for both cases, and the rise in temperature of the catalyst during the coke burn off will not vary substantially because a major portion of the oxygen in the air is consumed during the burn off period of both cases. Because substantially all of the oxygen in the regeneration air is consumed during the coke burn off period at the start of regeneration, it is desirable to hold the reactor completing regeneration in parallel with the reactor starting regeneration in order to maintain a minimum average outlet oxygen concentration of about 50 percent of the normal. However, it would also be possible to bypass air around the reactor starting regeneration to accomplish this. If the oxygen concentration were allowed to fall to 0 percent, the fires in the direct combustion chambers downstream of the reactors would be extinguished. Since the dehydrogenation process referred to herein involves reacting the hydrocarbon feed at a pressure below about 5 p.s.i.a., it is necessary to periodically pressure a reactor with air from approximately this 5.0 p.s.i.a. to full regeneration pressure before a reactor can be regenerated. In order to effect this change in pressure and supply the regeneration air to the process, it is necessary to accomplish this pressuring prior to regeneration. This pressure change may be effected by valve means not shown which bypasses the main inlet air valve. This valve supplies the required air at a constant rate to avoid upsetting the turbine. This same valve may also be used to supply the air purge flow that is required by the process. Because the reactor pressure must be reduced at the end of the regeneration period, it is necessary to depressure the reactor directly to the atmosphere by means of a separate depressuring valve connected to the stack. In accordance with the drawing, the air loss due to purging and depressuring is removed by conduit 28.

The hot regeneration effluent gases recovered from the reactors or reactors represented by box 26 at a temperature of about 1125° F. and at a rate of about 700,000 pounds per hour are passed by conduit 30 to indirect heat exchanger 14 as hereinbefore described. The regeneration effluent gases are then removed from indirect heat exchanger 14 by conduit 32 at a reduced temperature of about 860° F. and passed through suitable heat recovery equipment identified by box 36. During passage of the regeneration effluent gases through heat recovery zone 36, the temperature of the regeneration gases is reduced to about 390° F. Thereafter, the regeneration effluent gases at a reduced temperature and pressure are passed to a catalyst fines removal step 42 by conduit 40 wherein any entrained catalyst fines are removed from the effluent gases. In the catalyst fines removal step, cyclone separators or any other suitable catalyst fines removal equipment may be employed without departing from the scope of this invention.

The regeneration effluent gases recovered from the catalyst fines removal step 42 are then passed by conduit 44 to the hot effluent booster compressor 46. The booster compressor 46 may be driven by any suitable method, such as a steam turbine, which elevates the pressure of the regeneration effluent stream to about 79 p.s.i.a., or substantially equal to the pressure of the regeneration air discharged from the prime mover compressor and a temperature of approximately 455° F. Thereafter the pressurized regeneration effluent stream is passed by conduit 48 for further use in the process as herein described. As previously stated, the flow of the regeneration effluent gases through either conduit 78 or 50 is dependent, either or both, upon the desired oxygen content of the regeneration gas stream and the incremental amount of recycle gases required to supply the quantity of regeneration gases required in the process. In the event that there is a maximum limit placed upon the oxygen content of the regeneration gases, a major proportion of the pressurized effluent gases from the booster compressor 46 will be bypassed or recycled by conduit 78 for admixture with a metered proportion of compressed air supplied by the outlet of compressor 2 through conduit 10. However, in the event that there is no upper limit placed upon the oxygen content of the regeneration air in conduit 10, bypass line 78 may be eliminated and bypass line 50 employed alone for providing the necessary recycle of regeneration effluent gases to the regeneration air in conduit 10. In this specific embodiment, substantially all or a major portion of the regeneration effluent gases from compressor 46 are passed by conduit 48 and conduit 52 to burner 54 of fired turbine 4 with a minor proportion of the effluent gases recycled by conduit 50 amounting to about 55,370 pounds per hour for admixture with the regeneration air from the compressor 2 passed to the process by conduit 10. The regeneration effluent gases amounting to about 646,920 pounds per hour at a temperature of about 454° F. and a pressure of about 78 p.s.i.a., is passed by conduit 52 to the burner 54 wherein additional fuel or combustible material is admitted by conduit 58 to raise the temperature of the gasess by combustion therewith to about 1250° F. prior to entering the turbine 4 of the prime mover. The expanding of the pressurized gases at an elevated temperature in the fired turbine provides sufficient brake horsepower (B.H.P.) not only to drive the air compressor coaxially connected thereto by shaft 6, but also to produce additional rated net shaft brake horsepower at power take off 72 connected by shaft 74, which power may be used in other parts of the process, such as in the product recovery section of the process, not shown. The fuel fired in the turbine introduced by conduit 58 and use of a large open interconnecting pipe having negligible frictional pressure drop between the air compressor discharge and the turbine inlet enables admixture with the regeneration air passed to the indirect heat exchanger. The major portion of the compressed effluent gases at a temperature within the range of from about 320° F. to about 750° F. are heated to an elevated temperature within the range of from about 1150° F. to about 1450° F., preferably 1250° F., by burning with a combustible material in the fired turbine. The hot gases are expanded in the turbine and the fired turbine exhaust gases at a reduced temperature of about 600° F. to about 850° F. and approximately atmospheric pressure are then passed to a direct fired burner which again raises the temperature of the gases by combustion with a combustible material to a level sufficiently elevated in the range of from about 730° F. to about 1300° F., to give the necessary preheat to the turbine effluent gases which are then passed to waste heat recovery particularly for process steam generation.

It is contemplated within the scope of this invention to pass the expanded turbine effluent gases at an elevated temperature to an indirect heat exchanger in addition to the regeneration effluent heat exchanger located in the regeneration air side of the process.

Such an arrangement would reduce the heat duty and size of the regeneration effluent indirect heat exchanger and enable an increased heat recovery in the regeneration effluent side of the process.

The outstanding improvement of the present invention resides in the technique of installing a gas turbine-compressor referred to as a prime mover in a regeneration system which need only be rated at the power required to drive the external shaft load. Accordingly, the process air requirement for regeneration is supplied primarily through the use of a booster compressor in the effluent regeneration gas stream, which through suitable interconnecting piping returns this air to the regeneration inlet piping or the fired turbine at essentially the same pressure. In the event, however, that the air quantity available from the gas turbine air compressor is below the process requirement, the booster compressor simply recycles the required incremental amount of air from the regeneration effluent stream or process outlet back to the regeneration process inlet by the interconnecting piping. On the other hand, if the air from the compressor of the gas turbine exceeds the process requirement, the excess air passes directly to the turbine by the interconnecting piping and simply bypasses the process. Normally the parallel flow of gases between the turbine compressor outlet and the fired turbine inlet will not be required, except where there is an upper limit on the oxygen content of the regeneration gas stream. This flow may be automatically controlled by suitable flow recorders and valve means contained in the lines as desired. Accordingly, the location of the booster compressor in the process of the present invention provides in addition to the advantages hereinbefore described, sufficient head to overcome the pressure drop in the system between the compressor outlet and the fired turbine inlet. It also facilitates direction of flow of the regeneration effluent gases in the system as required. The booster-compressor may be driven by the gas-turbine compressor prime mover or a separate steam turbine, motor, etc., or any other suitable equipment.

It is believed that the present invention may be best described by reference to the accompanying drawing which shows the inventive features of the present invention as applied for example to the regeneration system for a catalytic dehydrogenation process. The drawing is a diagrammatic illustration in elevation of an arrangement of apparatus of the present invention employing a booster compressor in the regeneration effluent stream in combination with a fired turbine-compressor prime mover for supplying regeneration effluent gases to the process as required.

The application of the improved method for supplying regeneration air to a dehydrogenation process for the production of butadiene is illustrated in the drawing. This technique as it is adapted to the dehydrogenation process utilizes a booster compressor in conjunction with a gas turbine-compressor prime mover to provide the large quantity of regeneration air required for the regeneration process as well as to develop the rated power output of the prime mover to drive a fixed or external load attached to the prime mover. The improved process, in accordance with applicants' invention allows the regeneration of the catalyst to take place at elevated pressures of from about 55 to about 95 p.s.i.a., preferably about 72 p.s.i.a. In the dehydrogenation of hydrocarbons, for example, the dehydrogenation of butane to butylene or butadiene in a plurality of fixed bed reactors, the process is carried out at temperatures above about 1050° F. and usually below about 1300° F.

Referring now to the drawing, which represents, by way of example, a regeneration process for a plant to produce about 40,000 tons per year of butadiene, air at a rate of approximately 660,000 pounds per hour is admitted by conduit 8 to the compression stage 2 of a gas turbine-compressor prime mover. The air compressor 2 of the prime mover compresses approximately 660,000 pounds per hour of atmospheric air to a pressure of about 78 p.s.i.a., and a temperature of about 496° F. This air flow includes process air loss that occurs during depressuring, as well as plant and instrument air of about 4600 pounds per hour, which is taken off at the discharge outlet of the air compressor by conduit 12. An unrestricted bypass conduit 50 is provided connecting the compressor discharge conduit 10 to the turbine combustion chamber inlet conduit 52 to provide substantially unrestricted flow of compressed gases from the compression stage to the fired turbine. Conduit 50 may be used to either bypass air from the compressor 2 to the turbine inlet 52 or to recycle a portion of the regeneration effluent stream in conduit 48 to conduit 10, depending upon the demands of the process. This, of course, is assuming that there is no upper limit on the oxygen content of the regeneration stream in conduit 10. In those processes where there is an upper limit on the oxygen content of the regeneration stream in conduit 10, a portion of the compressed air at the outlet of the compressor will be mixed with the bulk of the regeneration effluent stream recycled by conduit 78 and controlled by suitable valves and flow recorder 80 with the major portion of the compressed air passed to the fired turbine inlet. The compressed regeneration air and make up recycle regeneration effluent gases are then passed by conduit 10 at a rate of about 720,000 pounds per hour and a temperature of about 496° F. to an indirect heat exchanger 14. In heat exchanger 14 the regeneration air is heated by indirect heat exchange with the hot effluent regeneration gases, at a temperature of about 1125° F., which are passed to the heat exchanger 14 by conduit 30 at a rate of about 700,000 pounds per hour. In heat exchanger 14, the temperature of the regeneration air is raised from approximately 495° F. to about 767° F., prior to passing by conduit 16 to direct fired burner heater 18. The quantity of heat that may be exchanged in indirect heat exchanger 14 is the difference of the heat required to raise the temperature of the regeneration air from about 495° F. to about 1175° F. and the allowable heat that may be added by direct firing without exceeding the water partial pressure upper limit of about 5 p.s.i.a. in the regeneration air. As previously pointed out, however, this is facilitated by virtue of the fact that the pressure of the regeneration process has been reduced from about 89 p.s.i.a., to about 72 p.s.i.a. The preheated regeneration air recovered from indirect heat exchanger 14 is then passed by conduit 16 at a temperature of about 767° F. to direct fired heater 18. In direct fired heater 18 the remaining heat required to elevate the temperature of the regeneration air to about 1175° F. is obtained by direct firing a combustible material with a portion of combustible material with a portion of said regeneration air and the quantity of combustible material being burned with said regeneration air limited such that the partial pressure of water vapor contained in said regeneration air passed to said contact zone will be limited to a desired value, passing heated regeneration air from said direct fired heating zone to said regeneration zone to effect said regeneration, recovering regeneration effluent gases containing products of combustion from said regeneration zone at an elevated temperature and reduced pressure, passing said recovered regeneration effluent gases to said indirect heat exchange zone, recovering effluent gases of reduced temperature and pressure from said indirect heat exchange zone and passing the same to a second compression zone, compressing effluent gases in said second compression zone to a pressure substantially equal to the pressure of the regeneration air discharged from said first compression zone, combining a portion of said compressed regeneration air from said first compressor with compressed effluent gases from said second compressor and passing the combined gases to said fired turbine, expanding said combined gases at an elevated temperature in said fired turbine to provide the power requirements of an external load attached to said prime mover, recovering expanded gases from said fired turbine and passing the same at an elevated temperature to a steam generation zone, passing steam to the inlet of said fired turbine in sufficient quantities to supplement gases lost from the process and controlling the power output of the turbine by adding a combustible material to the gases passed to said fired turbine.

5. A process for regenerating a bed of finely divided catalyst material in a regeneration zone which comprises, compressing regeneration air in a first compression stage, heating said compressed regeneration air to an elevated temperature in an indirect heat exchange zone, passing regeneration air at an elevated temperature to said regeneration zone to effect regeneration of said catalytic material, separating regeneration effluent gases from said regeneration zone and passing the same to said indirect heat exchange zone, recovering effluent gases from said heat exchange zone, separating entrained catalyst fines from said effluent gases, passing effluent gases from said fines separating step to a second compression zone, compressing said effluent gases in said second compression zone to a sufficient pressure to permit recycle of a major portion of said effluent stream for admixture with a minor portion of regeneration air from said first compression zone passed to said indirect heat exchange zone, passing the remaining portion of said compressed effluent stream admixed with a major portion of said regeneration air from said first compressor zone to a fired turbine zone and expanding said admixed stream at an elevated temperature in said fired turbine to provide the power requirements of said first compressor zone.

6. In a cyclic process wherein large quantities of a gaseous material at an elevated temperature and pressure are passed to a contact zone containing finely divided solid contact material to effect a desired reaction and heat the contact material, effluent gases are separated from said contact zone and a portion of the effluent gases are recycled to the contact zone, the method for improving the thermal efficiency of the process which comprises employing the compression zone of a fired turbine-compressor prime mover to supply said gaseous material at a desired elevated pressure, heating said compressed gaseous material to an elevated temperature by passing the same first through an indirect heat exchange zone and then through a direct fired heating zone, passing gaseous material at an elevated temperature and pressure from said direct fired heating zone to said contact zone, recovering effluent gases from said contact zone and passing the same to said indirect heat exchange zone to impart heat to said compressed gaseous material and reduce the temperature of said effluent gases, recovering effluent gases from said indirect heat exchange zone and passing the same to a heat recovery zone for the generation of process steam, recovering effluent gases of reduced temperature and pressure from said heat recovery zone, compressing effluent gases of reduced temperature and pressure in a second compression zone to a pressure substantially equal to the pressure of the gaseous material discharged from said first compression zone, passing a portion of the compressed effluent gases at an elevated temperature to said fired turbine, expanding said compressed effluent gases in said fired turbine, recovering expanded effluent gases from said fired turbine, and generating steam for use in the process by passing expanded effluent gases at an elevated temperature to a steam generation zone.

7. In a process for employing a fired turbine-compressor prime mover for supplying large volumes of a regeneration gas at an elevated pressure to a contact zone to regenerate a bed of catalytic material and in which process regeneration effluent gases are passed to said fired turbine, the method for improving the thermal efficiency of the process while supplying said regeneration gases at an elevated temperature and pressure to said contact zone which comprises passing compressed air from said prime mover compressor in indirect heat exchange with said regeneration effluent gases, separating compressed regeneration air from said indirect heat exchange step at an elevated temperature and pressure, passing compressed regeneration air at an elevated temperature to said contact zone, recovering effluent gases from said indirect heat exchange step, further reducing the temperature of said effluent gases by passing the same to a steam generation heat recovery zone, recovering effluent gases of reduced temperature and pressure from said heat recovery zone, passing effluent gases of reduced temperature and pressure to a second compression zone, in said second compression zone compressing the effluent gases to a pressure substantially equal to the pressure of the regeneration gas discharged from the compression stage of said prime mover, passing a portion of the compressed effluent gases to the outlet of said prime mover compressor for admixture with said regeneration gas, passing the remaining portion of said compressed effluent gases to said fired turbine, expanding said compressed effluent gases at an elevated temperature in said fired turbine, recovering expanded effluent gases from said fired turbine and firing the effluent gases recovered from said fired turbine to heat the effluent gases to an elevated temperature sufficient to impart heat to the gases discharged from the compressor of said prime mover.

8. A process for regenerating a bed of finely divided catalytic material in a reaction zone contaminated with carbonaceous material by burning with an oxygen containing regeneration gas while simultaneously heating the catalyst bed to a uniform elevated temperature for the dehydrogenation of a hydrocarbon reactant which comprises compressing oxygen containing regeneration gas to an elevated pressure in a first compression zone, heating said compressed oxygen containing regeneration gas by passing the same to an indirect heat exchange zone in indirect heat exchange with regeneration effluent gases hereinafter described, recovering oxygen containing regeneration gases at an elevated temperature in the range of from about 525° F. to about 825° F. from said indirect heat exchange zone, further heating said compressed regeneration gas by direct combustion with a combustible material to a desired elevated temperature, the incremental temperature increase of the regeneration gases by combustion being controlled to the extent that the water partial pressure of the regeneration gas is maintained below about 5 p.s.i.a., recovering regeneration gas at an elevated temperature and pressure from said combustion heating step and passing the same to said reaction zone to effect the desired regeneration of the developing the maximum net shaft brake horsepower. This is facilitated by employing a booster compressor in the effluent gas stream to overcome the pressure drop of the system as herein described. The expanded turbine exhaust gases at a temperature of about 730° F. and approximately 14.7 p.s.i.a. are then passed at a rate of about 653,290 pounds per hour by conduit 60 to direct fired burner 62. In direct fired burner 62 any available cheap fuel or combustible material is added by conduit 64 in sufficient quantity to elevate the temperature of the gases to about 1040° F. by burning with the turbine effluent gases. The hot effluent gases are then passed by conduit 66 to steam generation or waste heat recovery equipment 68 for the production of steam to be utilized in the process as herein described. For example, a portion of the process steam may be employed to drive the booster compressor. In any event process steam is recovered from the heat recovery section by conduit 76 for use as herein described. It is contemplated within the scope of this invention to appropriately interconnect heat recovery zone 36 with heat recovery section 68 to facilitate production of process steam. Referring back now to the inlet to the fired turbine, conduit 56 is provided for introducing steam produced in the heat recovery zone at an elevated pressure to the regeneration effluent gases passing to burner 54. While the steam may be added either intermittently or continuously to the process to replace process air losses, applicants favor the continuous addition of approximately 2290 pounds per hour in this specific embodiment, while varying the amount of fuel added to the burner to maintain the power output of the turbine constant without upsetting the load attached thereto.

Various auxiliary equipment has been eliminated from the drawing as a matter of convenience and its use and location will become apparent to those skilled in the art. In addition, various alterations and/or modifications of the present invention will become apparent to those skilled in the art from the previous description without departing from the scope of this invention.

Having thus described our invention we claim:

1. A method for supplying large volumes of gaseous material to a bed of contact material in a contact zone at a desired temperature and pressure which comprises compressing said gaseous material in a first compression zone, passing a portion of said compressed gaseous material to an indirect heat exchange zone, separating compressed gaseous material from said indirect heat exchange zone and passing the same to a direct fired heat exchange zone wherein a combustible fuel is burned in the presence of said gaseous material to elevate the temperature of said gaseous material, separating gaseous material of elevated temperature and pressure from said heat exchange zone and passing the same to said contact zone to effect the desired contact therein, separating effluent gases from said contact zone at an elevated temperature and pressure, passing said separated effluent gases to said indirect heat exchange zone, recovering effluent gases from said indirect heat exchange zone and passing the same at a reduced temperature and pressure to a solids removal zone, wherein entrained solid material in the effluent gases are separated from said effluent gases, removing effluent gases from said solids removal zone and passing the same to a second compression zone, in said second compression zone raising the pressure of said effluent gases substantially equal to the pressure of the gaseous material leaving said first compression zone, passing compressed effluent gases from said second compression zone to a fired turbine zone, expanding said compressed effluent gases at an elevated temperature in said fired turbine zone to provide the power requirements for said first compression zone and providing free flow of gaseous material between the inlet to said fired turbine zone and the outlet from said first compression zone.

2. In a process employing a fired turbine-compressor prime mover for supplying large volumes of regeneration gases to a contact zone containing a bed of finely divided contact material, the improvement which comprises, compressing said regeneration gases in the compression zone of said prime mover to a desired elevated pressure, heating said compressed regeneration gases in a heating zone to an elevated temperature, passing said compressed regeneration gases at an elevated temperature to said contact zone to regenerate said bed of finely divided contact material, separating regeneration effluent gases at an elevated temperature from said contact zone and passing the same in indirect heat exchange with said compressed regeneration gases, separating effluent gases of reduced temperature and pressure from said indirect heat exchange step and compressing the same in a second compression zone to an elevated pressure substantially equal to the pressure of the regeneration gases leaving said prime mover compression zone, separating compressed effluent gases from said second compression zone and expanding the same at an elevated temperature in the turbine zone of said prime mover to provide the power requirements of said prime mover compressor, providing flow of gaseous material between the inlet to said fired turbine and the outlet of said prime mover compressor, recovering expanded effluent gases from said turbine, heating said expanded effluent gases by burning with a combustible material in a direct fired heating zone, passing heated effluent gases from said direct fired heating zone to a steam generation zone, separating steam from said steam generation zone for use in the process as desired.

3. An improved method for efficiently utilizing a fired turbine-compressor prime mover to provide the power requirements of an external load attached thereto while simultaneously providing large volumes of air to a contact zone containing finely divided catalyst which comprises, separating compressed air at an elevated temperature from the compression stage of said prime mover, passing a portion of said compressed air with steam to the inlet of said fired turbine, heating the remaining portion of said compressed air by indirect heat exchange to an elevated temperature, further heating said compressed air of elevated temperature by direct firing of a combustible material with a portion thereof in a direct fired heating zone, separating heated compressed air from said direct fired heating zone and passing the same to said contact zone, separating hot effluent gases from said contact zone and passing the same to said indirect heat exchange zone, separating effluent gases from said indirect heat exchange zone of reduced temperature and passing the same to a second compression zone, in said second compression zone elevating the pressure of said effluent gases to a pressure substantially equal to the pressure of the air at the outlet of said first compression zone, combining compressed effluent gases from said second compression zone with compressed air and steam passed to the inlet of said fired turbine, firing and expanding said gaseous stream passed to said fired turbine to provide the power requirements of said external load, recovering expanded gases from said turbine of reduced temperature, heating said expanded gases to an elevated temperature for passage to a steam generation zone to generate steam therein, and recovering steam from said steam generation zone for use in the process.

4. In a process for supplying regeneration gases at an elevated temperature and pressure to a bed of finely divided catalyst in a regeneration zone to remove carbonaceous deposits by burning, the improvement which comprises, employing the compression stage of a fired turbine-compressor prime mover to compress regeneration air to regeneration pressure, elevating the temperature of said compressed regeneration air by passing the same first through an indirect heat exchange zone and then through a direct fired heating zone, the incremental temperature increase imparted to the regeneration air by the direct fired heating zone being effected by burning a contaminated catalytic material, recovering regeneration effluent gas containing entrained catalytic fines from said reaction zone at an elevated temperature in the range of from about 525° F. to about 1250° F. and passing the same at an elevated pressure to said indirect heat exchange zone, recovering regeneration effluent gases from said indirect heat exchange zone and passing the same to a heat recovery zone, separating regeneration effluent gas from said heat recovery zone at a temperature in the range of from about 300° F. to about 750° F., separating entrained fines from the regeneration effluent gas separated from said heat recovery zone, recovering regeneration effluent gas of reduced temperature and pressure from said fines removal step and passing the same to a second compression zone, compressing regeneration effluent gases in said second compression zone to an elevated pressure within the range of from about 65 p.s.i.a., to about 100 p.s.i.a., sufficient to permit flow of gases from said second compression zone to said first compression zone, recycling a portion of regeneration effluent gas from said second compression zone for admixture with regeneration gas discharged from said first compression zone, heating the remaining portion of compressed regeneration effluent gas to a temperature within the range of from about 1150° F. to about 1450° F. by direct combustion with a combustible material, expanding the heated and compressed regeneration effluent gases in a turbine power generating zone, employing a portion of the power developed by said turbine to drive said first compressor, recovering expanded effluent gas from said turbine at a temperature in the range of from about 600° F. to about 850° F., heating said expanded regeneration effluent gas recovered from said turbine in a direct fired heating zone by combustion with a combustible material to an elevated temperature within a range of from about 800° F. to about 1300° F., and passing expanded effluent gases at said elevated temperature from said direct fired heating zone to a process steam generating zone.

9. The proces of claim 8 in which process steam is added continuously to the compresed effluent gases passed to the turbine and the power output of the turbine is controlled by regulating the amount of a combustible material added to the effluent gases passed to the fired turbine.

10. The process of claim 8 in which process steam is added intermittently to the fired turbine with the compressed regeneration effluent gases to control the power output of said fired turbine.

11. The improved method for supplying large volumes of regeneration gas at an elevated temperature and pressure to effect regeneration of contaminated catalytic material which comprises, compressing regeneration gases to a pressure of about 78 p.s.i.a., in the compression zone of a fired turbine-compressor prime mover, heating said compressed regeneration air to an elevated temperature of about 1175° F. by passing said gases first through an indirect heat exchange zone and then a direct fired heating zone, the incremental temperature increase contributed by said direct fired heating zone to said regeneration gases being controlled to maintain the water partial pressure of said regeneration gases below about 5 p.s.i.a., passing compressed regeneration gases at an elevated temperature from said direct fired heating zone to said catalyst reaction zone requiring regeneration, effecting regeneration of said catalyst in said catalytic reaction zone, separating regeneration effluent gases from said reaction zone at a temperature of about 1125° F. and passing the same to said indirect heat exchange zone, recovering regeneration effluent gases from said indirect heat exchange zone at a temperature of about 860° F. and passing the same to a heat recovery zone, in said heat recovery zone reducing the temperature of said regeneration effluent gases to about 390° F. and passing regeneration effluent gases of reduced temperature and a pressure of about 65 p.s.i.a. to a second compression zone, in said second compression zone compressing said regeneration effluent to a pressure substantially equal to the pressure of the regeneration gases discharged from said first compression zone, recovering compressed regeneration effluent gases from said second compression zone and recycling a portion of said effluent gases for admixture with the regeneration gases discharged from said first compression zone, passing the remaining portion of said compressed regeneration effluent gases at an elevated temperature admixed with process steam to the fired turbine of said prime mover, expanding compressed effluent gases and steam in said turbine under conditions to develop the rated power output of said prime mover, and recovering expanded effluent gases discharged from said prime mover at an elevated temperature sufficient to impart heat to the regeneration gases discharged from said first compression zone.

12. A method for supplying gaseous material to a heat generating zone and utilizing the hot gaseous product effluent stream recovered therefrom which comprises compressing gaseous feed material in a first compression zone, heating said compressed gaseous feed material to an elevated temperature in an indirect heat exchange zone, passing gaseous feed material at an elevated temperature and pressure to said heat generating zone, recovering a hot gaseous product effluent stream from said heat generating zone and passing the same to said indirect heat exchange zone to effect at least partial cooling of said hot product effluent stream, passing cooled gaseous product effluent to a second compression zone wherein the gaseous product effluent is compressed to a pressure sufficient to permit recycling of a portion thereof for admixture with a portion of said compressed gaseous feed material prior to passage of said gaseous feed materials to said indirect heat exchange zone, passing another portion of said compressed gaseous product effluent admixed with a portion of said compressed gaseous feed material at a higher temperature than the temperature of the gaseous streams obtained from said compression zones to a turbine zone wherein the gaseous stream is expanded to provide at least the power requirements of said first compression zone and maintaining substantially unrestricted flow of at least one stream of gaseous material between the streams of gaseous material recovered from said first and second compression zone.

13. A method for supplying gaseous material to a heat generating zone and utilizing the hot gaseous product effluent stream recovered therefrom which comprises compressing gaseous feed material in a first compression zone of a turbine-compressor prime mover, heating the thus compressed gaseous feed material to an elevated temperature, passing the thus heated and compressed gaseous feed material to a heat generating zone, recovering gaseous product material at an elevated temperature from said heat generating zone, treating the recovered gaseous product material sufficiently to permit passing it at a reduced temperature to a second compression zone by giving up part of its heat to the compressed feed material passed to said heat generating zone, compressing and recovering gaseous product material of reduced temperature in a second compression zone, providing the power requirements of said second compression zone with steam generated in the process, passing compressed gaseous product material recovered from said second compression zone mixed with compressed gaseous feed material to a combustion zone, heating the mixture of gaseous material to an elevated temperature by combustion in said combustion zone, expanding the thus heated mixture of compressed gaseous material in a turbine zone of said prime mover to provide prime mover power output substantially equal to the horsepower rating of said turbine compressor prime mover, recovering expanded product gaseous material from said turbine zone and heating the same to an elevated temperature by combustion with a combustible fuel, generating process steam with said expanded product material heated to an elevated temperature and providing unrestricted flow of gaseous material between the compressed gaseous product material recovered from said second compression zone to the compressed gaseous feed material recovered from said first compression zone for recycle to said heat generating zone.

References Cited in the file of this patent

UNITED STATES PATENTS

| | | |
|---|---|---|
| 2,167,655 | Houdry et al. | Aug. 1, 1939 |
| 2,262,195 | Noack | Nov. 11, 1941 |
| 2,310,244 | Lassiat | Feb. 9, 1943 |
| 2,758,979 | Guthrie | Aug. 14, 1956 |
| 2,816,857 | Hemminger | Dec. 17, 1957 |
| 2,831,041 | Sieg et al. | Apr. 15, 1958 |